(12) United States Patent
Chen et al.

(10) Patent No.: US 12,387,762 B2
(45) Date of Patent: Aug. 12, 2025

(54) VIDEO EDITING METHOD AND APPARATUS, ELECTRONIC DEVICE AND MEDIUM

(71) Applicant: BAIDU ONLINE NETWORK TECHNOLOGY (BEIJING) CO., LTD., Beijing (CN)

(72) Inventors: Miao Chen, Beijing (CN); Xiju Liao, Beijing (CN); Ting Yun, Beijing (CN); Yuanhang Li, Beijing (CN); Yupeng Ning, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/254,837

(22) PCT Filed: Jul. 8, 2022

(86) PCT No.: PCT/CN2022/104740
§ 371 (c)(1),
(2) Date: May 26, 2023

(87) PCT Pub. No.: WO2023/109103
PCT Pub. Date: Jun. 22, 2023

(65) Prior Publication Data
US 2024/0395285 A1    Nov. 28, 2024

(30) Foreign Application Priority Data
Dec. 15, 2021 (CN) .......................... 202111536505.6

(51) Int. Cl.
*G11B 27/031* (2006.01)
*G06V 20/40* (2022.01)
(Continued)

(52) U.S. Cl.
CPC ............ *G11B 27/031* (2013.01); *G06V 20/41* (2022.01); *G06V 40/171* (2022.01); *G10L 25/57* (2013.01)

(58) Field of Classification Search
CPC .... G11B 27/031; G06V 20/41; G06V 40/171; G10L 25/57
(Continued)

(56) References Cited

U.S. PATENT DOCUMENTS 8,595,009 B2 * 11/2013 Lu ........................... G10L 25/48
704/238
9,305,530 B1 * 4/2016 Durham .................. G10L 25/45
(Continued)

FOREIGN PATENT DOCUMENTS

| CN | 102902756 A | 1/2013 |
| CN | 109121022 A | 1/2019 |

(Continued)

OTHER PUBLICATIONS

English Translation of Chinese Publication CN113762056 (Year: 2021).*

(Continued)

*Primary Examiner* — Loi H Tran
(74) *Attorney, Agent, or Firm* — Seed IP Law Group LLP

(57) ABSTRACT

Provided are a video editing method, an electronic device and a medium. The video editing method includes: acquiring a first video; cutting the first video to obtain a plurality of segments; determining a plurality of labels respectively corresponding to the plurality of segments, each label among the plurality of labels selected from one of a first label, a second label, a third label or a fourth label, where the first label indicates singing, where the second label indicates speaking, where the third label indicates background music, and where the fourth label indicates a segment that does not (Continued)

correspond to the first label, the second label or the third label; determining a singing segment set based on the plurality of labels, the singing segment set including consecutive segments among the plurality of segments that correspond to the first label; and generating a second video based on the singing segment set.

15 Claims, 4 Drawing Sheets

(51) Int. Cl.
*G06V 40/16* (2022.01)
*G10L 25/57* (2013.01)

(58) Field of Classification Search
USPC .......................................................... 386/285
See application file for complete search history.

(56) References Cited

U.S. PATENT DOCUMENTS

| | | |
|---|---|---|
| 2012/0281969 A1 | 11/2012 | Jiang et al. |
| 2017/0309296 A1 | 10/2017 | Sun |
| 2018/0295396 A1 | 10/2018 | Ramadorai et al. |

FOREIGN PATENT DOCUMENTS

| | | | |
|---|---|---|---|
| CN | 109905772 A | 6/2019 |
| CN | 110263215 A | 9/2019 |
| CN | 110381371 A | 10/2019 |
| CN | 111182358 A | 5/2020 |
| CN | 111935537 A | 11/2020 |
| CN | 112235613 A | 1/2021 |
| CN | 112911332 A | 6/2021 |
| CN | 113163272 A | 7/2021 |
| CN | 113613065 A | 11/2021 |
| CN | 113762056 A | 12/2021 |
| CN | 114245171 A | 3/2022 |
| ES | 2338962 A1 | 5/2010 |
| GB | 2523330 A | 8/2015 |
| KR | 20210060127 A | 5/2021 |

OTHER PUBLICATIONS

English Translation of Chinese Publication CN113163272 (Year: 2021).*

English Translation of Chinese Publication CN112150997 (Year: 2020).*

Su et al., "Extraction and synthesis of the motion role based on video," College of Mechanical and Electrical Engineering, Hohai University, Changzhou 213022, China, 4 pages.

Wang et al., "A Video-driven Approach to 3D Human Animation Synthesis," Journal of System Simulation, vol. 19 No. 8, Apr. 2007, 6 pages.

Zhu et al., "A Method for Video Synopsis Based on Multiple Object Tracking," Security & Video Surveillance Engineering Technology Research Center of Jiangsu Province, Nanjing, 210012, China, 5 pages.

* cited by examiner

VIDEO EDITING METHOD AND APPARATUS, ELECTRONIC DEVICE AND MEDIUM

CROSS REFERENCE TO RELATED APPLICATIONS

The present application claims the priority of the Chinese patent application No. 2021115365056 filed on Dec. 15, 2021, of which the entire contents are incorporated herein by reference.

TECHNICAL FIELD

The present disclosure relates to the technical field of data processing, particularly relates to video processing and artificial intelligence, and specifically relates to a video editing method and apparatus, an electronic device, a computer readable storage medium and a computer program product.

BACKGROUND

As a kind of information media, information in a video form has received more and more attention. In particular, a short video form has attracted the attention and welcome of audience. Based on this, how to edit a video to extract a wonderful and effective short video becomes very meaningful.

A method described in this part is not necessarily a method that has been conceived or employed previously. Unless otherwise specified, it should not be assumed that any method described in this part is regarded as the prior art only because it is included in this part. Similarly, unless otherwise specified, a problem mentioned in this part should not be regarded as being publicly known in any prior art.

SUMMARY

The present disclosure provides a video editing method and apparatus, an electronic device, a computer readable storage medium and a computer program product.

According to an aspect of the present disclosure, a video editing method is provided, including: acquiring a first video; cutting the first video to obtain a plurality of segments; determining a plurality of labels respectively corresponding to the plurality of segments, wherein each label among the plurality of labels is selected from one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label; determining a singing segment set based on the plurality of labels, the singing segment set including two or more consecutive segments among the plurality of segments that correspond to the first label; and generating a second video based on the singing segment set.

According to an aspect of the present disclosure, a video editing apparatus is provided, including: a first video acquiring unit configured to acquire a first video; a segment acquiring unit configured to cut the first video to obtain a plurality of segments; a label determining unit configured to determine a plurality of labels respectively corresponding to the plurality of segments, wherein each label among the plurality of labels is selected from one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label; a segment set determining unit configured to determine a singing segment set based on the plurality of labels, the singing segment set including two or more consecutive segments among the plurality of segments that correspond to the first label; and a second video generating unit configured to generate a second video based on the singing segment set.

According to an aspect of the present disclosure, an electronic device is provided, including: at least one processor; and a memory in communication connection with the at least one processor, wherein the memory stores instructions executable by the at least one processor, and the instructions are executed by the at least one processor, so that the at least one processor can execute the video editing method according to one or more embodiments of the present disclosure.

According to an aspect of the present disclosure, a non-transitory computer readable storage medium storing a computer instruction is provided, wherein the computer instruction is used for causing a computer to execute the video editing method according to one or more embodiments of the present disclosure.

According to an aspect of the present disclosure, a computer program product is provided, including a computer program, wherein the computer program, when executed by a processor, implements the video editing method according to one or more embodiments of the present disclosure.

According to one or more embodiments of the present disclosure, the video may be accurately edited to obtain a video related to singing.

It should be understood that the content described in this part is not intended to identify key or important features of the embodiments of the present disclosure, and is not used to limit the scope of the present disclosure as well. Other features of the present disclosure will become easily understood through the following specification.

BRIEF DESCRIPTION OF THE DRAWINGS

Accompanying drawings exemplarily show the embodiments, constitute a part of the specification, and together with text description of the specification, serve to explain example implementations of the embodiments. The shown embodiments are only for the purpose of illustration, and do not limit the scope of the claim. In all the accompanying drawings, the same reference numerals refer to the similar but not necessarily the same elements.

DETAILED DESCRIPTION

The example embodiments of the present disclosure are illustrated below with reference to the accompanying drawings, including various details of the embodiment of the present disclosure for aiding understanding, and they should be regarded as being only example.

Therefore, those skilled in the art should realize that various changes and modifications may be made on the embodiments described here without departing from the scope of the present disclosure. Similarly, for clarity and simplicity, the following description omits description of a publicly known function and structure.

In the present disclosure, unless otherwise noted, describing of various elements by using terms "first", "second" and the like does not intend to limit a position relationship, a time sequence relationship or an importance relationship of these elements, and this kind of terms is only used to distinguish one component from another component. In some examples, a first element and a second element may refer to the same instance of this element, while in certain cases, they may also refer to different instances based on the contextual description.

The terms used in description of various examples in the present disclosure are only for the purpose of describing the specific examples, and are not intended to limit. Unless otherwise explicitly indicated in the context, if the quantity of the elements is not limited specially, there may be one or more elements. In addition, the term "and/or" used in the present disclosure covers any one of all possible combination modes in the listed items.

The embodiment of the present disclosure will be described below in detail with reference to the accompanying drawings.

Figure 1:
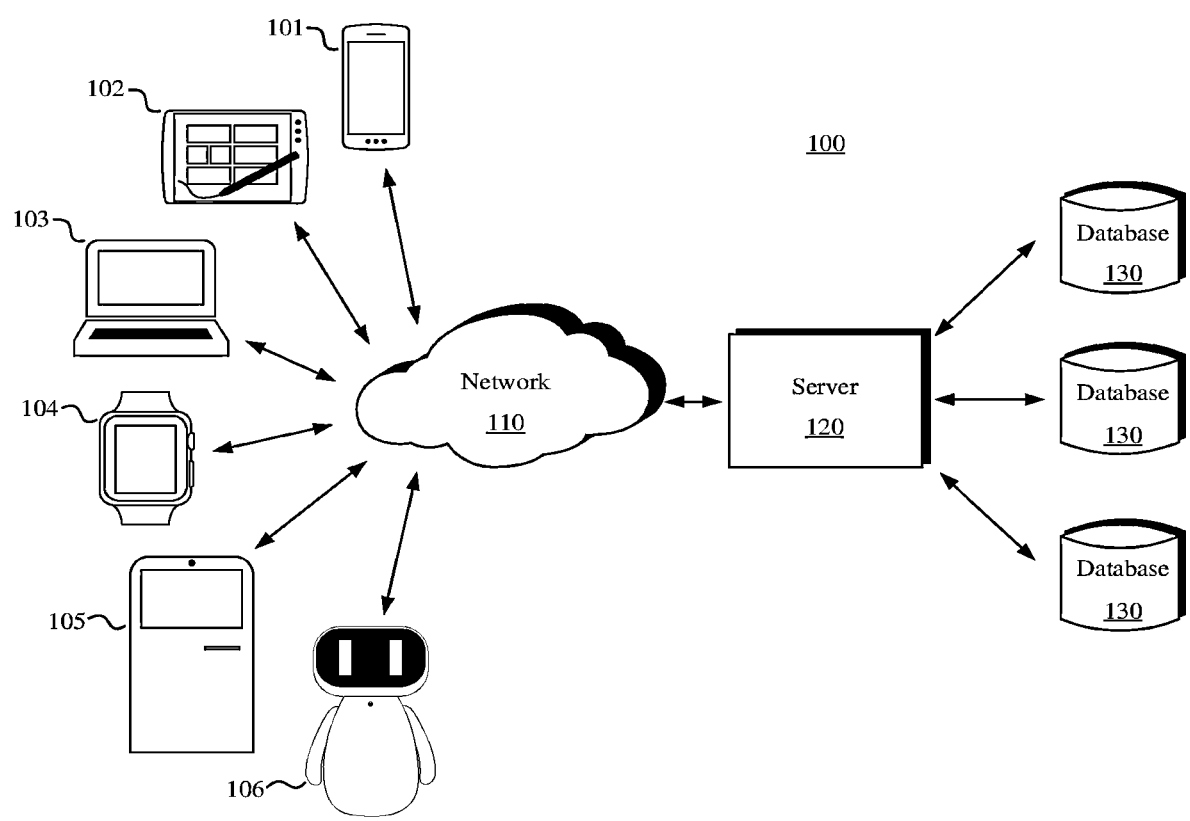
FIG. 1 shows a schematic diagram of an example system in which various methods described herein may be implemented according to an embodiment of the present disclosure.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120, and one or more communication networks 110 for coupling the one or more client devices to the server 120. The client devices 101, 102, 103, 104, 105 and 106 may be configured to execute one or more application programs.

In the embodiment of the present disclosure, the server 120 may run to be capable of executing one or more service or software applications of a video editing method according to the present disclosure.

In certain embodiments, the server 120 may further provide other services or software applications which may include a non-virtual environment and a virtual environment. In certain embodiments, these services may serve as a web-based service or cloud service to be provided, for example, be provided to users of the client devices 101, 102, 103, 104, 105 and/or 106 under a software as a service (SaaS) model.

In the configuration shown in FIG. 1, the server 120 may include one or more components for implementing functions executed by the server 120. These components may include a software component, a hardware component or a combination thereof capable of being executed by one or more processors. The users operating the client devices 101, 102, 103, 104, 105 and/or 106 may sequentially utilize one or more client application programs to interact with the server 120, so as to utilize the service provided by these components. It should be understood that various different system configurations are possible, which may be different from the system 100. Therefore, FIG. 1 is an example of a system used for implementing various methods described herein, and is not intended to limit.

The users may use the client devices 101, 102, 103, 104, 105 and/or 106 to view a video, edit the video, and give feedback on a video editing result. The client devices may provide an interface that enables the users of the client devices to be capable of interacting with the client devices. The client devices may further output information to the users via the interface. Although FIG. 1 describes the six client devices, those skilled in the art will understand that the present disclosure may support any quantity of client devices.

The client devices 101, 102, 103, 104, 105 and/or 106 may include various types of computer devices, such as a portable handheld device, a general-purpose computer (such as a personal computer and a laptop computer), a workstation computer, a wearable device, an intelligent screen device, a self-service terminal device, a service robot, a game system, a thin client, various message transceiving devices, a sensor or other sensing devices, etc. These computer devices may run various types and versions of software application programs and operating systems, such as MICROSOFT Windows, APPLE iOS, a UNIX-like operating system, Linux or Linux-like operating system (such as GOOGLE Chrome OS); or include various mobile operating systems, such as MICROSOFT Windows Mobile OS, iOS, Windows Phone, and Android. The portable handheld device may include a cellular phone, an intelligent telephone, a tablet computer, a personal digital assistant (PDA), etc. The wearable device may include a head-mounted display (such as smart glasses) and other devices. The game system may include various handheld game devices, a game device supporting Internet, etc. The client devices can execute various different application programs, such as various Internet-related application programs, a communication application program (such as an electronic mail application program), and a short message service (SMS) application program, and may use various communication protocols.

A network 110 may be any type of network well known by those skilled in the art, and it may use any one of various available protocols (including but not limited to TCP/IP, SNA, IPX, etc.) to support data communication. As an example only, the one or more networks 110 may be a local area network (LAN), an Ethernet-based network, a Token-Ring, a wide area network (WAN), an Internet, a virtual network, a virtual private network (VPN), an intranet, an extranet, a public switched telephone network (PSTN), an Infrared network, a wireless network (such as Bluetooth and WIFI), and/or any combination of these and/or other networks.

The server 120 may include one or more general-purpose computers, dedicated server computers (such as personal computer (PC) servers, UNIX servers, and midrange servers), blade servers, mainframe computers, server clusters or any other proper arrangements and/or combinations. The server 120 may include one or more virtual machines running a virtual operating system, or other computing architectures involving virtualization (such as one or more flexible pools of a logic storage device capable of being virtualized so as to maintain a virtual storage device of the server). In various embodiments, the server 120 may run one or more services or software applications providing the functions described hereunder.

A computing unit in the server 120 may run one or more operating systems including any above operating system and any commercially available server operating system. The server 120 may further run any one of various additional server application programs and/or a middle tier application program, including an HTTP server, an FTP server, a CGI server, a JAVA server, a database server, etc.

In some implementations, the server 120 may include one or more application programs, so as to analyze and merge data feed and/or event update received from the users of the client devices 101, 102, 103, 104, 105 and 106. The server 120 may further include one or more application programs, so as to display the data feed and/or a real-time event via one or more display devices of the client devices 101, 102, 103, 104, 105 and 106.

In some implementations, the server 120 may be a server of a distributed system, or a server in combination with a blockchain. The server 120 may also be a cloud server, or an intelligent cloud computing server or an intelligent cloud host with an artificial intelligence technology. The cloud server is a hosting product in a cloud computing service system, so as to solve the defects of large management difficulty and weak business scalability in service of a traditional physical host and a virtual private server (VPS).

The system 100 may further include one or more databases 130. In certain embodiments, these databases may be used to store data and other information. For example, one or more of the databases 130 may be used to store information such as an audio file and a video file. The databases 130 may be resident at various positions. For example, a database used by the server 120 may be at a server 120 local, or may be away from the server 120, and may be in communication with the server 120 via network-based or dedicated connection. The databases 130 may be different types. In certain embodiments, the database used by the server 120 may be, for example, a relational database. One or more of these databases may store, update and retrieve data to the database and from the database in response to a command.

In certain embodiments, one or more of the databases 130 may further be used by the application program to store application program data. The database used by the application program may be different types of databases, such as a key value memory pool, an object memory pool, or a conventional memory pool supported by a file system.

The system 100 in FIG. 1 may be configured and operated in various modes, so as to be capable of applying various methods and apparatuses described according to the present disclosure.

Figure 2:
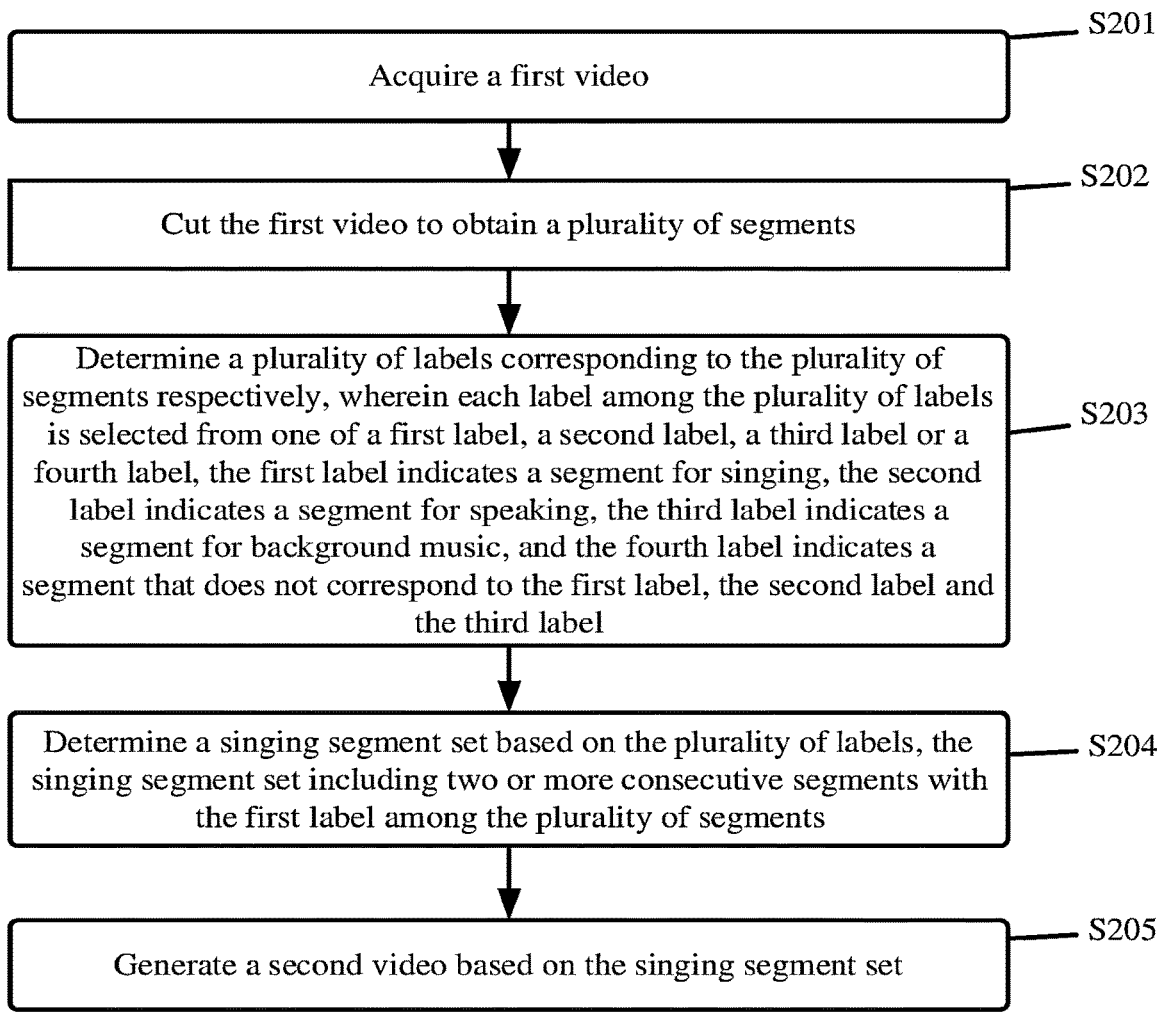
FIG. 2 shows a flow diagram of a video editing method according to an embodiment of the present disclosure.

A video editing method 200 according to an example embodiment of the present disclosure is described below with reference to FIG. 2.

In step S201, a first video is acquired.

In step S202, the first video is cut to obtain a plurality of segments.

In step S203, a plurality of labels respectively corresponding to the plurality of segments are determined, wherein each label among the plurality of labels is selected from one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label.

In step S204, a singing segment set is determined based on the plurality of labels, wherein the singing segment set includes two or more consecutive segments among the plurality of segments that correspond to the first label.

In step S205, a second video is generated based on the singing segment set.

According to the method of the embodiment of the present disclosure, the video can be accurately edited to obtain a video related to singing. In some implementations, through the above method 200, a boundary of singing can be accurately obtained by distinguishing singing from other voices (speaking, etc.) and singing from background music, so as to obtain a more accurate and flexible video editing effect.

At present, various live broadcasts such as singing and dancing anchors have a large market, so using such resources to generate a complete version of singing segments is very helpful for resource distribution and diversion. According to the embodiment of the present disclosure, video segment can be realized based on audio, video, voice and other modal information, and may be applied to the technical field of short video or live stream processing. According to the embodiment of the present disclosure, it is possible to obtain a short video detection algorithm with a clear singing boundary without depending on a fixed duration of a song, and with being capable of distinguishing whether to speak or not. In particular, by distinguishing a singing type from a speaking type, and distinguishing "background music" from other types in segments that are neither singing nor speaking, a segment for really singing can be more accurately screened out, so as to accurately obtain a short video of singing.

According to some embodiments, generating the second video based on the singing segment set may include: in response to determining that the singing segment set has at least one adjacent segment that corresponds to the third label, an extended segment set is determined based on the at least one adjacent segment that corresponds to the third label; and the second video is generated based on the singing segment set and the extended segment set.

In such embodiment, a singing segment may be more flexibly fused with a background music segment. As a specific non-limiting example scenario, there may be a piece of silent music in a first part and/or latter part of a certain singing video in a long video. In this case, the music is often a prelude or postlude to the singing, and in such consideration, segments with the "third label", namely, a background music label adjacent to the front and rear of the singing segment may be included.

According to some embodiments, determining the extended segment set based on the at least one adjacent segment that corresponds to the third label may include at least one of the following: in response to determining that a segment among the plurality of segments which is immediately before a starting segment of the singing segment set corresponds to the third label, a first segment is determined, wherein the first segment is before the starting segment among the plurality of segments and corresponds to the third label, wherein a segment that is immediately before the first segment corresponds to the fourth label, and wherein between the first segment and the starting segment there is no segment corresponding to a label other than the third label; and the extended segment set is determined to include two or more segments from the first segment to the starting segment; and in response to determining that a segment among the plurality of segments that is immediately after an ending segment of the singing segment set corresponds to the third label, a second segment is determined, wherein the second segment is after the ending segment among the plurality of segments and corresponds to the third label, wherein a segment that is immediately after the second segment corresponds to the fourth label, and wherein between the second segment and the ending segment there is no segment corresponding to a label other than the third label; and the extended segment set is determined to include two or more segments from the ending segment to the second segment.

In such embodiment, a boundary of the second video may be extended more accurately based on the background music. That is, conversion of only the label includes extension of an adjacent segment group from the fourth label to the third label then to the first label (or, from the first label to the third label then to the fourth label for the boundary extension after the singing segment, it may be understood that the order here does not limit the content of the present disclosure). As a non-limiting example, if there is a piece of silent music in the first part and/or latter part of the singing video, and it is "speaking" further forward/backward. For example, speak first, then play music, and then sing, thus the music in the middle is likely to be unrelated to singing, that is, it is likely to be a case of speaking in the background music first, and then starting singing. Therefore, in this case, the background music segment may be judged as not a prelude or a postlude, and the boundary will not be expanded.

According to some embodiments, generating the second video based on the singing segment set may include: boundary adjustment amount of the singing segment set is determined in response to determining that at least one of the starting segment or the ending segment of the singing segment set does not meet a confidence requirement; and the second video is determined based on the singing segment set and the boundary adjustment amount.

In such embodiment, when label reliability is not met, the boundary may be fine-grained adjusted. In some implementations, assuming that the segment on the boundary does not meet the confidence requirements (it is not sure whether it is really singing), the scenario may appear because an existing segment granularity, namely a length, is too long and covers a mixed scenario. For example, assuming the segment length is 3 seconds, it actually covers the first two seconds of speaking and the last second of singing. In this case, secondary boundary confirmation is required to determine the boundary adjustment amount (for example, being adjusted to the singing that covers only one second), so as to obtain a more accurate boundary.

According to some embodiments, each segment among the plurality of segments may have a first length, and determining the boundary adjustment amount of the singing segment set may include: for each to-be-adjusted segment in the starting segment and the ending segment that does not meet the confidence requirement: two adjustment segments associated with the to-be-adjusted segment are acquired, wherein each adjustment segment of the two adjustment segments is of the first length, the two adjustment segments joint at a first adjustment timing, and the first adjustment timing is located within the to-be-adjusted segment; labels are determined for the two adjustment segments respectively, wherein each label is selected from one of the first label, the second label, the third label or the fourth label; and in response to that the respective labels corresponding to the two adjustment segments meet a boundary condition, the boundary adjustment amount of the singing segment set is determined so as to adjust a corresponding boundary of the singing segment set to the first adjustment timing.

As a non-limiting example, assuming that the first length is 3 s, that is, a length of each segment is 3 s. An original boundary is recorded as a timing 0, and a time length of the boundary segment (assumed to be a starting boundary segment) is recorded as [0,3]. For example, a time window with a length of 3 s and a step size of is is utilized to cut near the boundary segment, or other cutting modes may be adopted, two associated adjustment segments may be generated and are recorded as [−2,1] and [−1,2] respectively. After that, label classification is performed respectively for the two adjustment segments. For example, if it is determined that the second adjustment segment [−1,2] is singing or background music, and the first adjustment segment [−2,1] is speaking or other scenarios, then it may be considered that the updated boundary is t=−1, so as to achieve finer boundary granularity. It can be understood that the above are examples, and other segment lengths, step sizes, cutting modes, granularity, etc. that can be thought of by those skilled in the art may be used to implement the methods of the embodiment of the present disclosure.

According to some embodiments, the boundary condition may include at least one of the following: in response to determining that the to-be-adjusted segment is the starting segment, that the former adjustment segment of the two adjustment segments corresponds to the second label or the fourth label, and that the latter adjustment segment corresponds to the first label or the third label; and in response to determining that the to-be-adjusted segment is the ending segment, that the former adjustment segment of the two adjustment segments corresponds to the first label or the third label, and the latter adjustment segment corresponds to the second label or the fourth label. In other words, the boundary condition may include fine-grained segmentation of boundary audio when the confidence is not enough, so as to acquire the updated boundary. For example, in a segment with the current granularity, it may be that the first second is speaking, and the last two seconds are singing.

Further, the adjustment segment with the label being the third label, i.e. "background music", may be included in the updated boundary, that is, the background music may be appropriately expanded. As a specific non-limiting example, when the boundary segment (still assuming that the length is 3 seconds) contains background music for two seconds, and the remaining second is "other scenarios", the background music for these two seconds may be included as an extension of the prelude or postlude of the singing segment. However, segments of other types, such as the second label and the fourth label, are not expanded.

According to some embodiments, determining the plurality of labels respectively corresponding to the plurality of segments may include: a confidence is determined for each label of the first label, the second label, the third label and the fourth label for each segment among the plurality of segments, and a label with a highest confidence is determined as the label of the segment. In such embodiment, the confidence requirement of the segment may include at least one of the following: that a difference between a confidence of the segment corresponding to the first label and a confidence of the segment corresponding to the second label is greater than a first threshold, or that a difference between the confidence of the segment corresponding to the first label and a confidence of the segment corresponding to the fourth label is greater than a second threshold. The confidence requirement may include that if the confidence difference between the two labels is too small, it may be considered as covering the mixed scenario, such as speaking in the first two seconds and singing in the last second. It may be understood that the above is only an example, and the present disclosure is not limited thereto.

According to some embodiments, determining the plurality of labels respectively corresponding to the plurality of segments may include: for each segment among the plurality of segments, a label is determined based on an audio feature and a picture feature of the segment.

Therefore, whether it is singing/speaking/background music can be determined based on the features of an audio and a picture. Audio feature extraction may be audio event feature extraction based on a Mel spectrum, for example, it may be audio feature extraction performed based on a bottom-up method of a local feature. In addition, in order to distinguish whether it is a scenario where an anchor plays a song but does not sing, further feature extraction and classification may further be performed by utilizing image information in the video in addition to the audio information.

According to some embodiments, the picture feature may include a facial feature and a time sequential feature of a lip region. The face may determine whether the anchor is in the picture, to avoid a situation that the anchor leaves the picture but the audio is playing. A lip motion feature may distinguish between live singing and playing of the song of the anchor. Thus, the more accurate label may be obtained, and then the more accurate boundary may be obtained.

Figure 3:
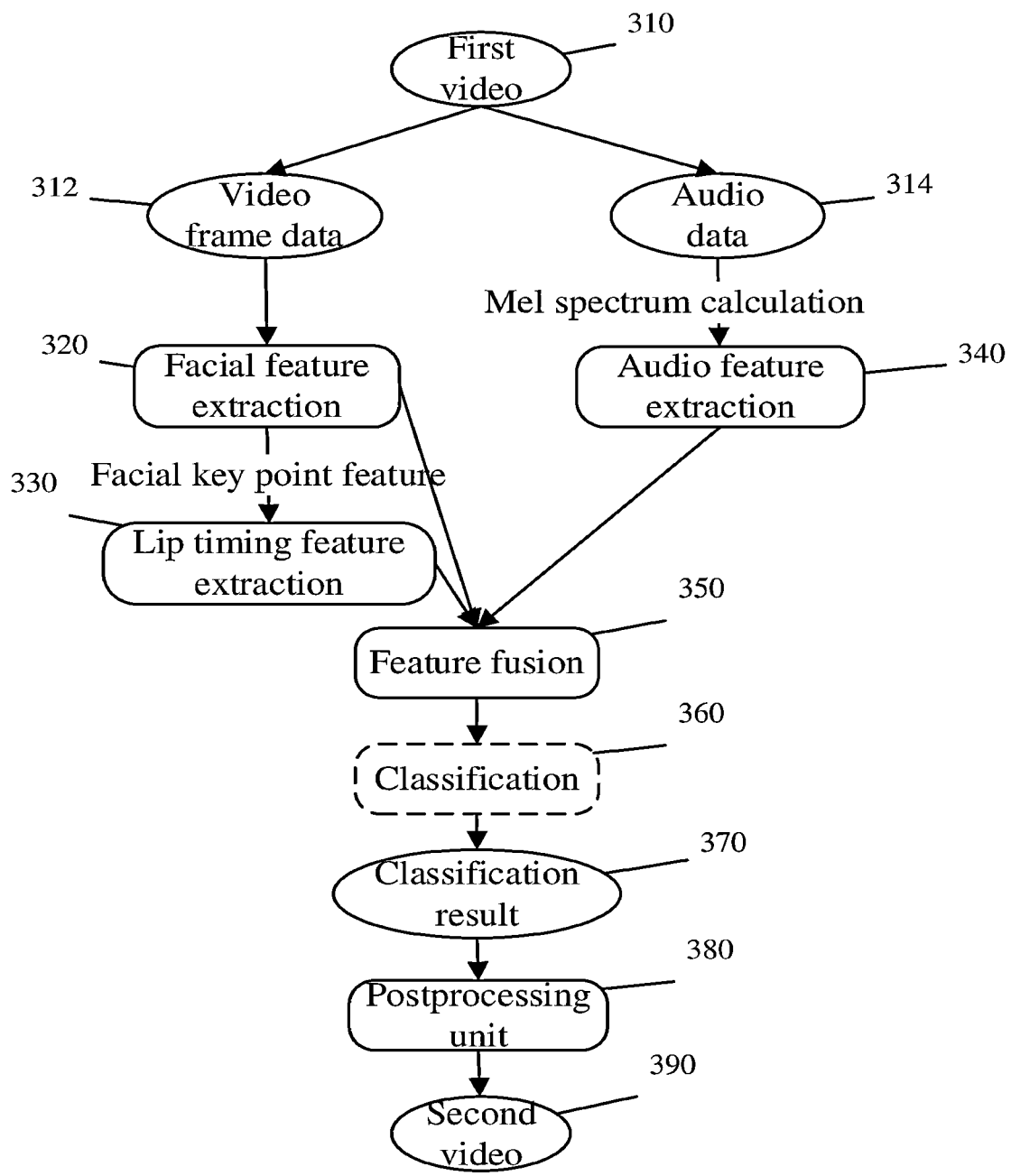
FIG. 3 shows a schematic diagram of a data stream of a video editing method according to an embodiment of the present disclosure.

A schematic diagram of a data stream in an example implementation for determining labels and feature extraction according to one embodiment of the present disclosure is described below with reference to FIG. 3.

The first video 310 is cut into a plurality of segments having the same length (such as 3 s). The selection of the length may consider an information amount rich degree and the required accuracy granularity. For example, a long video segment will include more information, and a short video segment will have more accurate time granularity when selecting a starting point. Therefore, it may be determined according to requirements, such as 0.5 s, 1 s, 3 s, 5 s and 10 s, and the present disclosure is not limited thereto. Video frame data, namely picture data 312 and audio data 314, are acquired respectively.

For the picture data 312, for example, extraction may be performed at 1 frame per second or at other frequencies to obtain an image. Then, the image is input to a facial feature extraction part 320, such as a CNN or other neural networks. The facial feature extraction part 320 may output a facial feature, and the extracted facial feature may be used to judge whether the anchor is in the picture, to avoid the situation that the anchor leaves the picture but the audio is playing. The facial feature extraction part 320 may be or may include a multi-task convolutional neural network (MTCNN), but the present disclosure is not limited thereto.

The facial feature extraction part 320 may further output a location of the lip feature region in face key points. The lip feature is output to a lip time sequential feature extraction part 330. The lip time sequential feature extraction part 330 aggregates the feature of the facial lip region in a time dimension to extract a feature of a lip motion. This feature may identify whether the anchor in the video is singing, so as to distinguish the live singing and playing of the song of the anchor. The lip time sequential feature extraction part 330 may be or may include temporal segment networks (TSNs), but the present disclosure is not limited thereto.

For the audio data 312, the Mel spectrum feature is extracted and converted into image information, and then audio feature extraction is performed by utilizing audio feature extraction 340, such as adoption of a neural network (such as CNN).

The extracted facial, lip, and audio features are input to a feature fusion part 350 for aggregating a voice feature, the facial feature, and the lip motion feature, for example, for concat of the features. Then, the label, namely a classification result 370, may be determined for each segment through a classification unit 360, for example, through a long short-term memory (LSTM), especially a feature fusion long short-term memory (FFLSTM). Then, a starting time point and an ending time point of a singing activity may be clustered in a timing dimension, i.e., the singing segment set described herein.

Post processing 380 may include boundary extension, boundary confirmation and other steps as described herein, and may also include video processing and video editing steps known to those skilled in the art such as generation and rendering of the second video, and it may be understood that the present disclosure is not limited thereto. Thus, the second video 390 can be obtained.

It may be understood that although the classification part 360 such as a classification network is shown in the figure, the present disclosure is not limited thereto. For example, the facial feature extraction part 320 may include a facial feature extraction and classification network, and be configured to output the key point features in the facial feature to a lip time sequential feature extraction and classification network 340, and output a facial classification result to the feature fusion part 350. Similarly, the lip time sequential feature extraction part and the audio feature extraction part may also include a classification result respectively, and in this case, the feature fusion part 350 only needs to fuse the three classification results so as to generate the classification result 370. It may be understood that both first classification and then aggregation and first feature aggregation and then classification may be used in the embodiment of the present disclosure, and the method of the embodiment of the present disclosure may also be applied to other methods that can be understood by those skilled in the art to classify based on the audio and picture features, including a method that does not use a neural network for classification.

Figure 4:
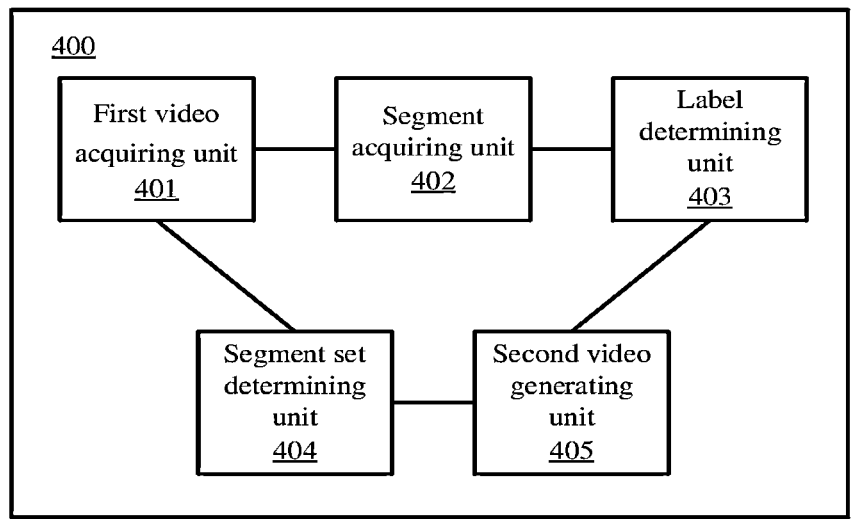
FIG. 4 shows a structural block diagram of a video editing apparatus according to an embodiment of the present disclosure.

A video editing apparatus 400 according to an embodiment of the present disclosure is described now below with reference to FIG. 4. The video editing apparatus 400 may include a first video acquiring unit 401, a segment acquiring unit 402, a label determining unit 403, a segment set determining unit 404, and a second video generating unit 405.

The first video acquiring unit 401 may be configured to acquire a first video. The segment acquiring unit 402 may be configured to cut the first video to obtain a plurality of segments. The label determining unit 403 may be configured to determine a plurality of labels respectively corresponding to the plurality of segments, wherein each label among the plurality of labels is selected from one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label. The segment set determining unit 404 may be configured to determine a singing segment set based on the plurality of labels, wherein the singing segment set includes two or more consecutive segments among the plurality of segments that correspond to the first label. The second video generating unit 405 may be configured to generate a second video based on the singing segment set.

According to the apparatus of the embodiment of the present disclosure, the video can be accurately edited to obtain a video related to singing.

According to some embodiments, the second video generating unit 405 may include: a unit configured to determine, in response to determining that the singing segment set has at least one adjacent segment that corresponds to the third label, an extended segment set based on the at least one adjacent segment that corresponds to the third label; and a unit configured to generate the second video based on the singing segment set and the extended segment set.

According to some embodiments, the unit configured to determine the extended segment set based on the at least one adjacent segment that corresponds to the third label may include at least one of the following: a unit configured to, in response to determining that a segment among the plurality of segments which is immediately before a starting segment of the singing segment set corresponds to the third label, execute the following operations: determining a first segment among the plurality of segments, wherein the first segment is before the starting segment and corresponds to the third label, wherein a segment that is immediately before the first segment corresponds to the fourth label, and wherein between the first segment and the starting segment there is no segment corresponding to a label other than the third label; and determining the extended segment set to include two or more segments from the first segment to the starting segment; and a unit configured to, in response to determining that a segment among the plurality of segments that is immediately after an ending segment of the singing segment set corresponds to the third label, execute the following operations: determining a second segment among the plurality of segments, wherein the second segment is after the ending segment and corresponds to the third label, wherein a segment that is immediately after the second segment corresponds to the fourth label, and wherein between the second segment and the ending segment there is no segment corresponding to a label other than the third label; and determining the extended segment set to include two or more segments from the ending segment to the second segment.

According to some embodiments, the second video generating unit 405 may include: a unit configured to determine a boundary adjustment amount of the singing segment set in response to determining that at least one of the starting segment or the ending segment of the singing segment set does not meet a confidence requirement; and a unit configured to determine the second video based on the singing segment set and the boundary adjustment amount.

According to some embodiments, each segment among the plurality of segments is of a first length, and the unit configured to determine the boundary adjustment amount of the singing segment set may include: a unit, for each to-be-adjusted segment in the starting segment and the ending segment that does not meet the confidence requirement, executing the following operations: acquiring two adjustment segments associated with the to-be-adjusted segment, wherein each adjustment segment of the two adjustment segments is of the first length, the two adjustment segments joint at a first adjustment timing, and the first adjustment timing is located within the to-be-adjusted segment; determining labels for the two adjustment segments respectively, wherein each label is selected from one of the first label, the second label, the third label or the fourth label; and in response to that the respective labels corresponding to the two adjustment segments meet a boundary condition, determining the boundary adjustment amount of the singing segment set so as to adjust a corresponding boundary of the singing segment set to the first adjustment timing.

According to some embodiments, the label determining unit 403 may include a unit, for each segment among the plurality of segments, executing the following operations: determining a confidence for each label of the first label, the second label, the third label and the fourth label, and determining a label with a highest confidence as the label of the segment. The confidence requirement of the segment includes at least one of the following: that a difference between a confidence of the segment corresponding to the first label and a confidence of the segment corresponding to the second label is greater than a first threshold, or that a difference between the confidence of the segment corresponding to the first label and a confidence of the segment corresponding to the fourth label is greater than a second threshold.

According to some embodiments, the label determining unit 403 may include: a unit configured to determine, for each segment among the plurality of segments, the label based on an audio feature and a picture feature of the segment.

According to some embodiments, the picture feature may include a facial feature and a time sequential feature of a lip region.

In the technical solution of the present disclosure, involved processing such as collecting, acquiring, storing, using, processing, transmitting, providing and disclosing of user personal information all conforms to provisions of relevant laws and regulations, and does not violate public order and moral.

According to embodiments of the present disclosure, an electronic device, a readable storage medium and a computer program product are further provided.

Figure 5:
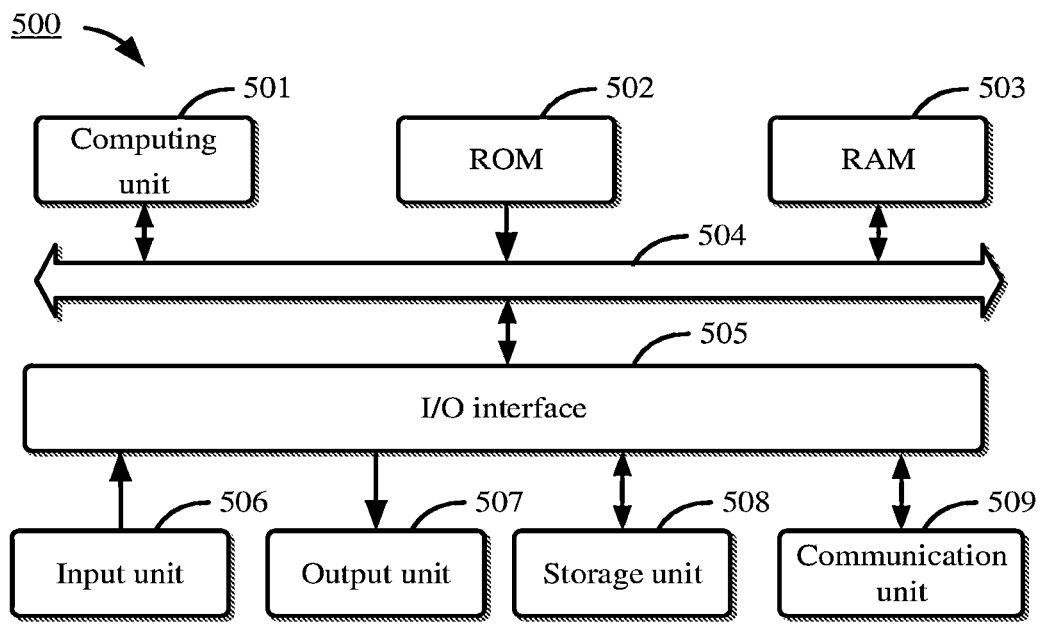
FIG. 5 shows a structural block diagram of an example electronic device capable of being used for implementing embodiments of the present disclosure.

Referring to FIG. 5, a structural block diagram of an electronic device 500 which can serve as a server or a client of the present disclosure will now be described, which is an example of a hardware device capable of being applied to all aspects of the present disclosure. The electronic device aims to express various forms of digital-electronic computer devices, such as a laptop computer, a desk computer, a work bench, a personal digital assistant, a server, a blade server, a mainframe computer and other proper computers. The electronic device may further express various forms of mobile apparatuses, such as a personal digital assistant, a cellular phone, an intelligent phone, a wearable device and other similar computing apparatuses. Components shown herein, their connection and relations, and their functions only serve as examples, and are not intended to limit implementation of the present disclosure described and/or required herein.

As shown in FIG. 5, the electronic device 500 includes a computing unit 501, which may execute various proper motions and processing according to a computer program stored in a read-only memory (ROM) 502 or a computer program loaded from a storage unit 508 to a random access memory (RAM) 503. In the RAM 503, various programs and data required by operation of the electronic device 500 may further be stored. The computing unit 501, the ROM 502 and the RAM 503 are connected with one another through a bus 504. An input/output (I/O) interface 505 is also connected to the bus 504.

A plurality of components in the electronic device 500 are connected to the I/O interface 505, and include: an input unit 506, an output unit 507, the storage unit 508 and a communication unit 509. The input unit 506 may be any type of device capable of inputting information to the electronic device 500, the input unit 506 may receive input digital or character information, and generate key signal input relevant to user setting and/or functional control of the electronic device, and may include but not limited to a mouse, a keyboard, a touch screen, a trackpad, a trackball, an operating lever, a microphone and/or a remote control. The output unit 507 may be any type of device capable of presenting information, and may include but not limited to a display, a loudspeaker, a video/audio output terminal, a vibrator and/or a printer. The storage unit 508 may include but not limited to a magnetic disc and an optical disc. The communication unit 509 allows the electronic device 500 to exchange information/data with other devices through a computer network such as Internet and/or various telecommunication networks, and may include but not limited to a modem, a network card, an infrared communication device, a wireless communication transceiver and/or a chip set, such as a Bluetooth™ device, a 802.11 device, a WiFi device, a WiMax device, a cellular communication device and/or analogues.

The computing unit 501 may be various general and/or dedicated processing components with processing and computing capabilities. Some examples of the computing unit 501 include but not limited to a central processing unit (CPU), a graphic processing unit (GPU), various dedicated artificial intelligence (AI) computing chips, various computing units running a machine learning model algorithm, a digital signal processor (DSP), and any proper processor, controller, microcontroller, etc. The computing unit 501 executes all the methods and processing described above, such as the method 200 and its variant embodiments. For example, in some embodiments, the method 200 and its variant embodiments may be implemented as computer software programs, which are tangibly contained in a machine readable medium, such as the storage unit 508. In some embodiments, part of all of the computer programs may be loaded into and/or mounted on the electronic device 500 via the ROM 502 and/or the communication unit 509. When the computer programs are loaded to the RAM 503 and executed by the computing unit 501, one or more steps of the method 200 and its variant embodiments described above may be executed. Alternatively, in other embodiments, the computing unit 501 may be configured to execute the method 200 and its variant embodiments through any other proper modes (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relationship of the client and the server is generated through computer programs run on a corresponding computer and mutually having a client-server relationship. The server may be a cloud server or a server of a distributed system, or a server in combination with a blockchain.

It should be understood that various forms of flows shown above may be used to reorder, increase or delete the steps. For example, all the steps recorded in the present disclosure may be executed in parallel, and may also be executed sequentially or in different sequences, as long as the expected result of the technical solution disclosed by the present disclosure may be implemented, which is not limited herein.

Although the embodiments or examples of the present disclosure have been described with reference to the accompanying drawings, it should be understood that the above methods, systems and devices are only example embodiments or examples, and the scope of the present disclosure is not limited by these embodiments or examples, but only limited by the authorized claim and equivalent scope thereof. Various elements in the embodiments or the examples may be omitted or may be replaced with their equivalent elements. In addition, all the steps may be executed through the sequence different from that described in the present disclosure. Further, various elements in the embodiments or the examples may be combined in various modes. It is important that with evolution of the technology, many elements described here may be replaced with the equivalent element appearing after the present disclosure.

The invention claimed is:

1. A computer-implemented video editing method, comprising:
    acquiring a first video;
    parsing the first video to obtain a plurality of segments;
    determining a plurality of labels respectively corresponding to the plurality of segments, wherein each label among the plurality of labels is one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label;
    determining a singing segment set based on the plurality of labels, the singing segment set comprising two or more consecutive segments among the plurality of segments that correspond to the first label; and
    generating a second video based on the singing segment set, wherein the generating the second video based on the singing segment set comprises:
    in response to determining that there is at least one adjacent segment that is adjacent to the singing segment and corresponds to the third label, determining an extended segment set based on the at least one adjacent segment that corresponds to the third label; and
    generating the second video based on the singing segment set and the extended segment set, and wherein determining the extended segment set based on the at least one adjacent segment that corresponds to the third label comprises at least one of prelude determination operation or postlude determination operation, so that the extended segment set contains at least one of a prelude or a postlude adjacent to the two or more consecutive segments with the first label but does not contain a segment representing speaking in the background music;
    wherein the prelude determination operation comprises in response to determining that a segment among the plurality of segments which is immediately before a starting segment of the singing segment set corresponds to the third label,
        determining a first segment among the plurality of segments, wherein the first segment is before the starting segment and corresponds to the third label, wherein a segment that is immediately before the first segment corresponds to the fourth label, and wherein between the first segment and the starting segment there is no segment corresponding to a label other than the third label; and
        determining the extended segment set to comprise two or more segments from the first segment to the starting segment; and
    wherein the postlude determination operation comprises in response to determining that a segment among the plurality of segments that is immediately after an ending segment of the singing segment set corresponds to the third label,
        determining a second segment among the plurality of segments, wherein the second segment is after the ending segment and corresponds to the third label, wherein a segment that is immediately after the second segment corresponds to the fourth label, and wherein between the second segment and the ending segment there is no segment corresponding to a label other than the third label; and
        determining the extended segment set to comprise two or more segments from the ending segment to the second segment.

2. The method according to claim 1, wherein the generating the second video based on the singing segment set comprises:
    in response to determining that at least one of a starting segment or an ending segment of the singing segment set does not meet a confidence requirement, determining a boundary adjustment amount of the singing segment set; and
    determining the second video based on the singing segment set and the boundary adjustment amount.

3. The method according to claim 2, wherein each segment among the plurality of segments is of a first length, and wherein the determining the boundary adjustment amount of the singing segment set comprises: for each to-be-adjusted segment in the starting segment and the ending segment that does not meet the confidence requirement:
    acquiring two adjustment segments associated with the to-be-adjusted segment, wherein each adjustment segment of the two adjustment segments is of the first length, wherein the two adjustment segments joint at a first adjustment timing, and wherein the first adjustment timing is located within the to-be-adjusted segment;
    determining labels for the two adjustment segments respectively, wherein each label of the labels for the two adjustment segments is one of the first label, the second label, the third label or the fourth label; and
    in response to that the respective labels for the two adjustment segments meet a boundary criterion, determining the boundary adjustment amount of the singing segment set so as to adjust a corresponding boundary of the singing segment set to the first adjustment timing.

4. The method according to claim 3, wherein the boundary criterion comprises at least one of the following:
    in response to determining that the to-be-adjusted segment is the starting segment, that a former adjustment segment of the two adjustment segments corresponds to the second label or the fourth label, and that a latter adjustment segment of the two adjustment segments corresponds to the first label or the third label; and in response to determining that the to-be-adjusted segment is the ending segment, that the former adjustment segment of the two adjustment segments corresponds to the first label or the third label, and that the latter adjustment segment corresponds to the second label or the fourth label.

5. The method according to claim 3, wherein the determining the plurality of labels respectively corresponding to the plurality of segments comprises: determining a confidence for each label of the first label, the second label, the third label and the fourth label for each segment among the plurality of segments, and determining a label with a highest confidence as the label of the segment, and wherein the confidence requirement of the segment comprises at least one of: that a difference between a confidence of the segment corresponding to the first label and a confidence of the segment corresponding to the second label is greater than a first threshold, or that a difference between a confidence of the segment corresponding to the first label and a confidence of the segment corresponding to the fourth label is greater than a second threshold.

6. The method according to claim 1, wherein determining the plurality of labels respectively corresponding to the plurality of segments comprises: for each segment among the plurality of segments, determining a label based on an audio feature and a picture feature of the segment.

7. The method according to claim 6, wherein the picture feature comprises a facial feature and a time sequential feature of a lip region.

8. An electronic device, comprising:
at least one processor; and
a memory in communication connection with the at least one processor, wherein
the memory stores instructions executable by the at least one processor, and the instructions are executed by the at least one processor, so that the at least one processor can perform a method comprising:
acquiring a first video;
parsing the first video to obtain a plurality of segments;
determining a plurality of labels respectively corresponding to the plurality of segments, wherein each label among the plurality of labels is one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label;
determining a singing segment set based on the plurality of labels, the singing segment set comprising two or more consecutive segments among the plurality of segments that correspond to the first label; and
generating a second video based on the singing segment set, wherein the generating the second video based on the singing segment set comprises:
in response to determining that there is at least one adjacent segment that is adjacent to the singing segment and corresponds to the third label, determining an extended segment set based on the at least one adjacent segment that corresponds to the third label; and
generating the second video based on the singing segment set and the extended segment set, and wherein determining the extended segment set based on the at least one adjacent segment that corresponds to the third label comprises at least one of prelude determination operation or postlude determination operation. so that the extended segment set contains at least one of a prelude or a postlude adjacent to the two or more consecutive segments with the first label but does not contain a segment representing speaking in the background music;

wherein the prelude determination operation comprises in response to determining that a segment among the plurality of segments which is immediately before a starting segment of the singing segment set corresponds to the third label, determining a first segment among the plurality of segments, wherein the first segment is before the starting segment and corresponds to the third label, wherein a segment that is immediately before the first segment corresponds to the fourth label, and wherein between the first segment and the starting segment there is no segment corresponding to a label other than the third label; and determining the extended segment set to comprise two or more segments from the first segment to the starting segment; and wherein the postlude determination operation comprises in response to determining that a segment among the plurality of segments that is immediately after an ending segment of the singing segment set corresponds to the third label, determining a second segment among the plurality of segments, wherein the second segment is after the ending segment and corresponds to the third label, wherein a segment that is immediately after the second segment corresponds to the fourth label, and wherein between the second segment and the ending segment there is no segment corresponding to a label other than the third label; and determining the extended segment set to comprise two or more segments from the ending segment to the second segment.

9. The electronic device according to claim 8, wherein the generating the second video based on the singing segment set comprises:

in response to determining that at least one of a starting segment or an ending segment of the singing segment set does not meet a confidence requirement, determining a boundary adjustment amount of the singing segment set; and determining the second video based on the singing segment set and the boundary adjustment amount.

10. The electronic device according to claim 9, wherein each segment among the plurality of segments is of a first length, and wherein the determining the boundary adjustment amount of the singing segment set comprises: for each to-be-adjusted segment in the starting segment and the ending segment that does not meet the confidence requirement:

acquiring two adjustment segments associated with the to-be-adjusted segment, wherein each adjustment segment of the two adjustment segments is of the first length, wherein the two adjustment segments joint at a first adjustment timing, and wherein the first adjustment timing is located within the to-be-adjusted segment;

determining labels for the two adjustment segments respectively, wherein each label of the labels for the two adjustment segments is one of the first label, the second label, the third label and the fourth label; and in response to that the respective labels for the two adjustment segments meet a boundary criterion, determining the boundary adjustment amount of the singing segment set so as to adjust a corresponding boundary of the singing segment set to the first adjustment timing.

11. The electronic device according to claim 10, wherein the boundary threshold comprises at least one of the following:

in response to determining that the to-be-adjusted segment is the starting segment, that a former adjustment segment of the two adjustment segments corresponds to the second label or the fourth label, and that a latter adjustment segment of the two adjustment segments corresponds to the first label or the third label; and in response to determining that the to-be-adjusted segment is the ending segment, that the former adjustment segment of the two adjustment segments corresponds to the first label or the third label, and that the latter adjustment segment corresponds to the second label or the fourth label.

12. The electronic device according to claim 10, wherein the determining the plurality of labels respectively corresponding to the plurality of segments comprises: determining a confidence for each label of the first label, the second label, the third label and the fourth label for each segment among the plurality of segments, and determining a label with a highest confidence as the label of the segment, and wherein the confidence requirement of the segment comprises at least one of: that a difference between a confidence of the segment corresponding to the first label and a confidence of the segment corresponding to the second label is greater than a first threshold, or that a difference between a confidence of the segment corresponding to the first label and a confidence of the segment corresponding to the fourth label is greater than a second threshold.

13. The electronic device according to claim 10, wherein the determining the plurality of labels respectively corresponding to the plurality of segments comprises: determining a confidence for each label of the first label, the second label, the third label and the fourth label for each segment among the plurality of segments, and determining a label with a highest confidence as the label of the segment, and wherein the confidence requirement of the segment comprises at least one of: that a difference between a confidence of the segment corresponding to the first label and a confidence of the segment corresponding to the second label is greater than a first threshold, or that a difference between a confidence of the segment corresponding to the first label and a confidence of the segment corresponding to the fourth label is greater than a second threshold.

14. The electronic device according to claim 8, wherein determining the plurality of labels respectively corresponding to the plurality of segments comprises: for each segment among the plurality of segments, determining a label based on an audio feature and a picture feature of the segment.

15. A non-transitory computer readable storage medium storing a computer instruction, wherein the computer instruction is configured to enable a computer to perform a method comprising:

acquiring a first video;

parsing the first video to obtain a plurality of segments;

determining a plurality of labels respectively corresponding to the plurality of segments, wherein each label among the plurality of labels is one of a first label, a second label, a third label or a fourth label, wherein the first label indicates a segment for singing, wherein the second label indicates a segment for speaking, wherein the third label indicates a segment for background music, and wherein the fourth label indicates a segment that does not correspond to the first label, the second label or the third label;

determining a singing segment set based on the plurality of labels, the singing segment set comprising two or more consecutive segments among the plurality of segments that correspond to the first label; and generating a second video based on the singing segment set, wherein generating the second video based on the singing segment set comprises:

in response to determining that the singing segment set has at least one adjacent segment that corresponds to the third label, determining an extended segment set based on the at least one adjacent segment that corresponds to the third label; and generating the second video based on the singing segment set and the extended segment set, and wherein determining the extended segment set based on the at least one adjacent segment that corresponds to the third label comprises at least one of prelude determination operation or postlude determination operation, so that the extended segment set contains at least one of a prelude or a postlude adjacent to the two or more consecutive segments with the first label but does not contain a segment representing speaking in the background music;

wherein the prelude determination operation comprises in response to determining that a segment among the plurality of segments which is immediately before a starting segment of the singing segment set corresponds to the third label, determining a first segment among the plurality of segments, wherein the first segment is before the starting segment and corresponds to the third label, wherein a segment that is immediately before the first segment corresponds to the fourth label, and wherein between the first segment and the starting segment there is no segment corresponding to a label other than the third label; and determining the extended segment set to comprise two or more segments from the first segment to the starting segment; and wherein the postlude determination operation comprises in response to determining that a segment among the plurality of segments that is immediately after an ending segment of the singing segment set corresponds to the third label, determining a second segment among the plurality of segments, wherein the second segment is after the ending segment and corresponds to the third label, wherein a segment that is immediately after the second segment corresponds to the fourth label, and wherein between the second segment and the ending segment there is no segment corresponding to a label other than the third label; and determining the extended segment set to comprise two or more segments from the ending segment to the second segment.

* * * * *